US 11,628,838 B2

(12) United States Patent
Kim et al.

(10) Patent No.: US 11,628,838 B2
(45) Date of Patent: Apr. 18, 2023

(54) METHOD OF IMPROVING FUEL EFFICIENCY OF FUEL CELL ELECTRIC VEHICLE BY USING NAVIGATION INFORMATION, AND APPARATUS AND SYSTEM THEREFOR (71) Applicants: HYUNDAI MOTOR COMPANY, Seoul (KR); KIA MOTORS CORPORATION, Seoul (KR)

(72) Inventors: Ki Chang Kim, Seoul (KR); Soon Oh Kwon, Suwon-si (KR); Young Woo Jung, Yongin-si (KR); Yu Han Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 262 days.

(21) Appl. No.: 16/896,523

(22) Filed: Jun. 9, 2020

(65) Prior Publication Data
US 2021/0179108 A1 Jun. 17, 2021

(30) Foreign Application Priority Data
Dec. 13, 2019 (KR) .................. 10-2019-0167082

(51) Int. Cl.
*B60W 30/18* (2012.01)
*H01M 8/04303* (2016.01)
(Continued)

(52) U.S. Cl.
CPC ....... *B60W 30/18072* (2013.01); *B60L 50/70* (2019.02); *B60R 16/0231* (2013.01);
(Continued)

(58) Field of Classification Search
CPC .......... B60W 30/18072; B60W 10/04; B60W 10/18; B60W 2520/10; B60W 2530/10; B60W 2552/15; B60W 30/143; B60W 2556/50; B60W 50/0097; B60W 10/28; B60W 40/076; B60W 40/105; B60W 40/13; B60W 2422/70; B60W 2510/0647; B60W 2510/083; B60W 2530/13; B60L 50/70;
(Continued)

(56) References Cited

U.S. PATENT DOCUMENTS

2011/0054768 A1* 3/2011 Sullivan ................ B60W 10/06
701/123
2014/0067225 A1* 3/2014 Lee .................. B60W 30/18072
701/93

(Continued)

Primary Examiner — Jason Holloway
(74) Attorney, Agent, or Firm — McDonnell Boehnen Hulbert & Berghoff LLP (57) ABSTRACT Disclosed are a method of improving fuel efficiency of a fuel cell electric vehicle, and an apparatus and a system therefor. The method includes collecting navigation information and vehicle speed information, calculating a coasting line when a specified event point is detected based on the navigation information, determining whether deceleration is necessary by comparing a current traveling speed with a coasting line speed corresponding to a current location, and changing a criterion for determining whether to enter a fuel cell stop (FC STOP) state when the deceleration is necessary as a determination result.

20 Claims, 9 Drawing Sheets (51) Int. Cl.
*H01M 8/04992* (2016.01)
*H01M 8/04228* (2016.01)
*B60L 50/70* (2019.01)
*B60W 10/04* (2006.01)
*B60R 16/023* (2006.01)
*B60W 10/18* (2012.01)

(52) U.S. Cl.
CPC ............ *B60W 10/04* (2013.01); *B60W 10/18* (2013.01); *H01M 8/04228* (2016.02); *H01M 8/04303* (2016.02); *H01M 8/04992* (2013.01); *B60W 2520/10* (2013.01); *B60W 2530/10* (2013.01); *B60W 2552/15* (2020.02); *H01M 2250/20* (2013.01)

(58) Field of Classification Search
CPC ...... B60L 15/20; B60L 58/30; B60L 2240/12; B60L 2240/423; B60L 2240/622; B60L 2240/64; B60L 2240/642; B60L 2240/645; B60L 2240/647; B60L 2260/24; B60L 50/75; B60L 3/0053; B60L 2240/24; B60R 16/0231; H01M 8/04228; H01M 8/04303; H01M 8/04992; H01M 2250/20; H01M 2008/1095; Y02E 60/50; Y02T 10/60; Y02T 10/64; Y02T 10/72; Y02T 10/70; Y02T 90/16; Y02T 90/40; B60Y 2200/91; B60Y 2300/18066
See application file for complete search history.

(56) References Cited

U.S. PATENT DOCUMENTS

2015/0039191 A1\* 2/2015 Cauthen .............. B60W 10/196
701/53
2016/0101780 A1\* 4/2016 Park ..................... B60W 50/14
701/70

\* cited by examiner

METHOD OF IMPROVING FUEL EFFICIENCY OF FUEL CELL ELECTRIC VEHICLE BY USING NAVIGATION INFORMATION, AND APPARATUS AND SYSTEM THEREFOR

CROSS REFERENCE TO RELATED APPLICATIONS

This application claims the benefit of priority to Korean Patent Application No. 10-2019-0167082, filed in the Korean Intellectual Property Office on Dec. 13, 2019, the entire contents of which are incorporated herein by reference.

TECHNICAL FIELD

The present disclosure relates to a fuel cell electric vehicle, and more particularly, to a technique of improving fuel efficiency of a fuel cell electric vehicle by using navigation information in a fuel cell-power storage unit hybrid vehicle having a fuel cell as a main power source and a power storage unit (battery) as an auxiliary power source.

BACKGROUND

In recent years, as the depletion of fossil fuel and environmental pollution due to exhaust gas has emerged, alternative energy sources have been actively developed to solve the environmental problems such as global warming. In particular, in the automotive field, research into using a fuel cell system, which is evaluated as a future power generation technology because of its high generation efficiency and no emission of pollutants due to power generation when compared with a conventional generation scheme, has been actively conducted.

A fuel cell, which is a kind of power generation device that converts chemical energy of a fuel into electric energy by electrochemically reacting in a fuel cell stack without converting it into heat by combustion, not only may supply power supply for industrial, domestic and vehicle driving, but also may be applied to the power supply of a small electrical/electronic product, especially a portable device.

When only the fuel cell is used as the power source of a vehicle, the fuel cell is responsible for all of the loads constituting the vehicle, so that performance degradation may occur in a driving range in which fuel cell efficiency is low.

In addition, in the high-speed driving range requiring a high voltage, due to the output characteristic in which the output voltage decreases rapidly, the voltage required by the driving motor cannot be sufficiently supplied, thereby degrading the acceleration performance of the vehicle.

In addition, when a load is suddenly applied to a vehicle, the fuel cell output voltage is suddenly dropped and power is insufficiently supplied to a drive motor, so that the vehicle performance is deteriorated (because electricity is generated by a chemical reaction, the fuel cell is unreasonable for sudden change in load).

In addition, because the fuel cell has a unidirectional output characteristic, the energy output from the driving motor cannot be recovered when the vehicle is braked, so that the efficiency of the vehicle system may be reduced.

The fuel cell-power storage unit hybrid vehicle is a hydrogen electric vehicle that is driven by the driving force generated by rotating the drive motor using the electrical energy supplied from the fuel cell as the main power source and the power storage unit (a supercapacitor or battery) as the auxiliary power source.

The hybrid vehicle in which the fuel cell and the power storage unit are directly connected to each other is driven by continuously outputting a constant power from the fuel cell. When the power is left, the power storage unit is charged with surplus power. When the power is insufficient, a driving mode is applied to the hybrid vehicle, in which insufficient power is supplemented by power storage unit.

In order to increase the fuel efficiency of the hydrogen electric vehicle, it is required to minimize the unnecessary fuel cell driving.

The process of stopping and resuming the generation of a fuel cell if necessary during the operation of a hydrogen electric vehicle to improve fuel efficiency of the hydrogen electric vehicle [Fuel cell stop (FC STOP)/fuel cell restart (FC RESTART) process], that is, the idle stop/release control process of temporarily stopping the generation of fuel cells in the fuel cell-battery [process of controlling the turn-on/off of the fuel cell], fuel cell-supercap hybrid vehicle should be importantly considered. The idle stop of the fuel cell during vehicle operation is a distinct difference from the complete shutdown of the fuel cell system after the vehicle is completely stopped. Thus, there is a need to clearly differentiate the control process for the idle stop of the fuel cell from the system shutdown control process.

Because a conventional hydrogen electric vehicle does not require driving power in a stationary state or a decelerated state, the fuel cell control logic for temporarily stopping the driving of the fuel cell to prevent unnecessary energy consumption has been used.

In addition, the conventional hydrogen electric vehicle has used a fuel cell control logic that enters a fuel cell stopped state after the motor torque drops to a certain level or less to enter the regenerative braking step.

However, there is a need to provide a method capable of maximizing fuel efficiency improvement effect of a hydrogen electric vehicle, which is differentiated from the related art.

SUMMARY

The present disclosure has been made to solve the above-mentioned problems occurring in the prior art while advantages achieved by the prior art are maintained intact.

An aspect of the present disclosure provides a method of improving fuel efficiency of a fuel cell electric vehicle by using navigation information, and an apparatus and a system therefor.

Another aspect of the present disclosure provides a method of improving fuel efficiency of a fuel cell electric vehicle by using navigation information, which can enter a fuel cell stationary state quickly and accurately by predicting the deceleration of a vehicle in advance based on map information obtained from the navigation, and an apparatus and a system thereof.

Still another aspect of the present disclosure provides a method of improving fuel efficiency of a fuel cell electric vehicle by using navigation information, which can increase the durability of a stack by minimizing a fuel cell stack operating time relative to a vehicle mileage through the aggressive entry into the fuel cell stop state, and an apparatus and a system thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method of improving fuel efficiency of a fuel cell electric vehicle includes collecting navigation information and vehicle speed information, calculating a coasting line when a specified event point is detected based on the navigation information, determining whether deceleration is necessary by comparing a current traveling speed with a coasting line speed corresponding to a current location, and changing a criterion for determining whether to enter a fuel cell stop (FC STOP) state when the deceleration is necessary as a determination result.

According to an embodiment, the coasting line may be calculated based on a coast down constant value, which is a unique value of a corresponding vehicle, and a weight of the corresponding vehicle.

According to an embodiment, the navigation information may include gradient information of a road slope from the current location to the event point, and distance information from the current location to the event point.

According to an embodiment, the method may further include correcting the calculated coasting line by using the gradient information and the distance information.

According to an embodiment, the determining of whether the deceleration is necessary may include determining that the deceleration is necessary when the current traveling speed is equal to or greater than the coasting line speed, and determining that the deceleration is unnecessary when the current traveling speed is smaller than the coasting line speed.

According to an embodiment, the changing of the criterion may include adjusting a reference motor torque to a specified level to enter the FC STOP state when the current traveling speed is equal to or greater than the coasting line speed, and entering the FC STOP state when a current motor torque is less than the reference motor torque.

According to an embodiment, the navigation information may be received from a navigation device through controller area network (CAN) communication, and the vehicle speed information may be received from a driving controller through the CAN communication.

According to an embodiment, the driving controller may include at least one of a brake controller, an accelerator controller, and a wheel sensor.

According to an embodiment, the navigation information and the vehicle speed information may be received from a navigation device through CAN communication.

According to an embodiment, the event point may include at least one of a road branch start point, a highway toll gate entry/exit point, a speed bump, a speed enforcement camera position, a speed limit change point, a safe driving section start point, a congestion section start point, a sharp curve section start point, and a right turn point.

According to an aspect of the present disclosure, a fuel cell system controller for controlling a fuel cell system includes a communication device that collects navigation information and vehicle speed information, a calculation device that calculates a coasting line when a specified event point is detected based on the navigation information, a determination device that determines whether deceleration is necessary by comparing a current traveling speed with a coasting line speed corresponding to a current location, and a change device that changes a criterion for determining whether to enter a fuel cell stop (FC STOP) state when deceleration is necessary as the determination result.

According to an embodiment, the calculation device may calculate the coasting line based on a coast down constant value, which is a unique value of a corresponding vehicle, and a weight of the corresponding vehicle.

According to an embodiment, the navigation information may include gradient information of a road slope from the current location to the event point, and distance information from the current location to the event point.

According to an embodiment, the fuel cell system controller may further include a correction device that corrects the calculated coasting line by using the gradient information and the distance information.

According to an embodiment, the determination device may determine that the deceleration is necessary when the current traveling speed is equal to or greater than the coasting line speed, and determine that the deceleration is unnecessary when the current traveling speed is smaller than the coasting line speed.

According to an embodiment, the change device may adjust a reference motor torque to a specified level to enter the FC STOP state when the current traveling speed is equal to or greater than the coasting line speed, and enter the FC STOP state to stop an air compressor of the fuel cell system when a current motor torque is less than the reference motor torque.

According to an embodiment, the navigation information may be received from a navigation device through controller area network (CAN) communication, and the vehicle speed information may be received from a driving controller through the CAN communication.

According to an embodiment, the driving controller may include at least one of a brake controller, an accelerator controller, and a wheel sensor.

According to an embodiment, the navigation information and the vehicle speed information may be received from a navigation device through CAN communication.

According to an embodiment, the event point may include at least one of a road branch start point, a highway toll gate entry/exit point, a speed bump, a speed enforcement camera position, a speed limit change point, a safe driving section start point, a congestion section start point, a sharp curve section start point, and a right turn point.

Objects of the inventive concept may not be limited to the above, and other objects will be clearly understandable to those having ordinary skill in the art from the following disclosures.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments will be described in detail with reference to FIGS. 1 to 9.

Briefly describing the configuration of a fuel cell system to help the understanding of the present disclosure, a polymer electrolyte membrane fuel cell (PEMFC: Proton Exchange Membrane Fuel Cell), which is the most studied as a power supply source for driving a vehicle, includes a membrane electrode assembly (MEA) to which a catalyst electrode layer is attached, where electrochemical reactions occur on both sides of an electrolyte membrane to which hydrogen ions move, a gas diffusion layer (GDL) for evenly distributing reaction gases and transmitting generated electrical energy, a gasket and a fastener for maintaining the airtightness and fastening pressure between the reaction gases and cooling water, and a bipolar plate for moving the reaction gases and the cooling water.

In the fuel cell, hydrogen as fuel and oxygen (air) as oxidant are supplied to the anode and the cathode of the membrane electrode assembly through the flow path of the bipolar plate, respectively. The hydrogen is supplied to the anode (also called 'fuel electrode' or 'hydrogen electrode' or 'oxide electrode') and the oxygen (air) is supplied to the cathode (also called 'air electrode', 'oxygen electrode' or 'reduction electrode'). The hydrogen supplied to the anode is decomposed into hydrogen ions (proton, H+) and electrons (e−) by the catalysts of the electrode layers formed on both sides of the electrolyte membrane, where only the hydrogen ions are selectively transferred to the cathode through the electrolyte membrane which is a proton exchange membrane and at the same time, the electrons are transferred to the cathode through the gas diffusion layer and the bipolar plate, which are conductors. In the cathode, the hydrogen ions supplied through the electrolyte membrane and the electrons transferred through the bipolar plate meet with oxygen in the air supplied to the cathode by an air supply device to cause a reaction of generating water. In this case, a flow of electrons occurs through an external conductive line due to the movement of hydrogen ions, so that current is generated due to the flow of electrons.

Figure 1:
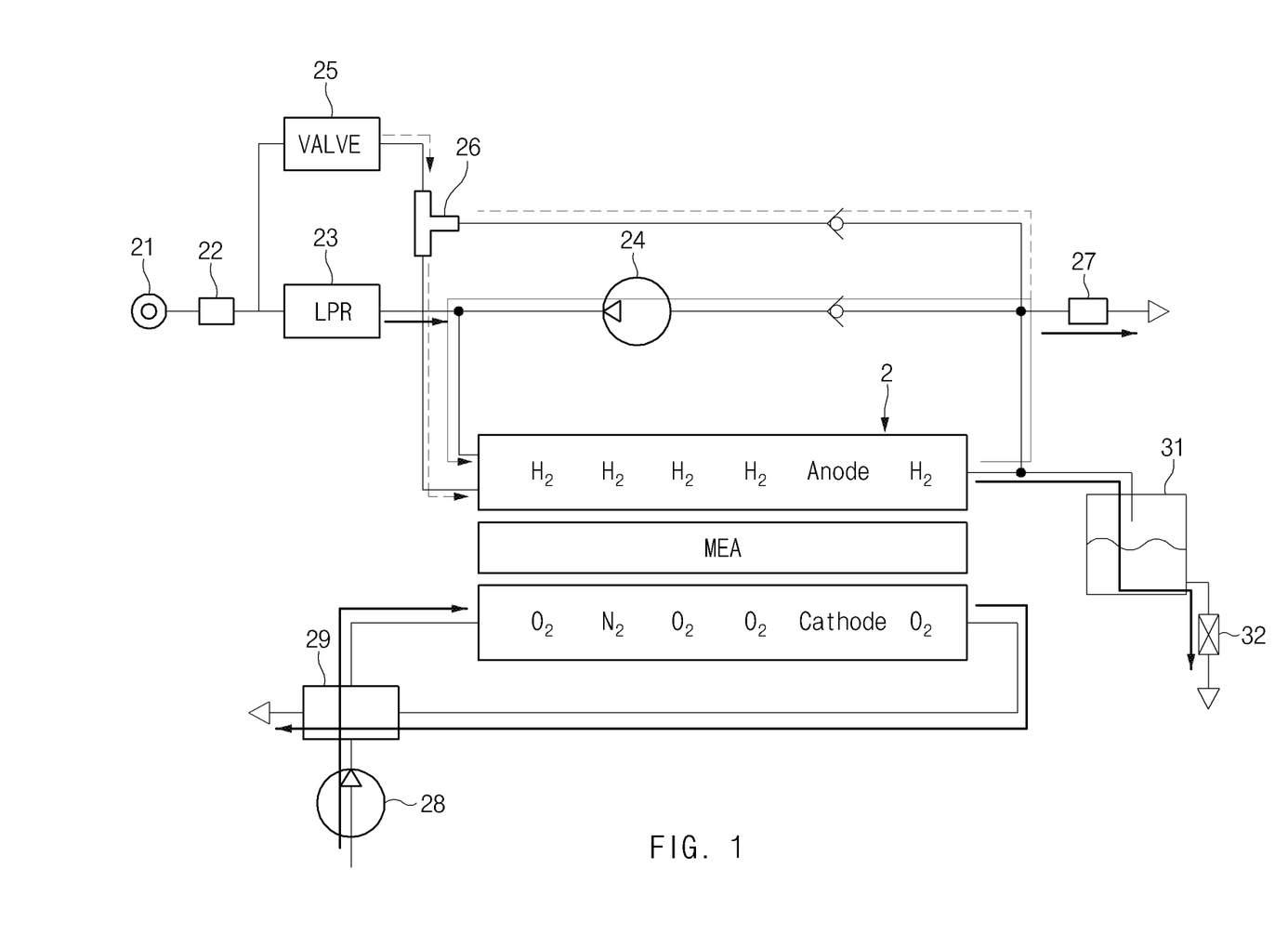
FIG. 1 is a view illustrating a structure of a fuel cell system according to an embodiment of the present disclosure.

FIG. 1 is a view illustrating a structure of a fuel cell system according to an embodiment of the present disclosure.

A fuel cell system according to an embodiment may include an air supply device and a hydrogen supply device.

As illustrated in FIG. 1, the dry air supplied through an air blower 28 is humidified through a humidifier 29 and then supplied to a cathode of a fuel cell stack 2. The exhaust gas of the cathode is transferred to the humidifier 29 while being humidified by the water component generated therein and is used to humidify the dry air to be supplied to the cathode by the air blower 28.

The hydrogen supply device includes two lines, where the first line supplies hydrogen to the anode of the fuel cell stack 2 through a low pressure regulator (LPR) 23 and some of the hydrogen at an anode outlet is recycled through a hydrogen recycle blower 24.

The second line supplies high pressure hydrogen directly to the anode through a valve 25 and an ejector 26, and some of the hydrogen at the anode outlet is recycled and supplied through an ejector 26.

Hydrogen crossover refers to a phenomenon in which residual hydrogen remaining in the anode reacts with oxygen of the cathode by directly passing through an electrolyte membrane without generation of electricity.

In order to reduce the amount of hydrogen crossover, the anode pressure should be lowered in the low power section lowering the stack output, and the anode pressure should be increased in the high power section increasing the stack output. This may be solved by using the low pressure regulator 23 alone when low pressure is required, and by supplying high pressure hydrogen through the control of the valve 25 when high pressure is required or when hydrogen is purged.

As the anode pressure (hydrogen pressure) increases, the amount of hydrogen crossover increases. It is necessary to maintain an appropriate anode pressure because hydrogen crossover adversely affects fuel efficiency and fuel cell durability.

A hydrogen purge valve 27 is used to secure the stack performance by discharging impurities and condensed water of the anode end. The anode outlet is connected to a water trap 31. When the condensed water is stored and the amount of condensed water reaches a certain level, the condensed water is discharged through a valve 32.

Meanwhile, the driving mode of a hybrid vehicle including a fuel cell as a main power source and a supercap (or a high voltage battery as a secondary cell) as a secondary power source may be classified into a fuel cell driving mode (EV mode) in which a motor is driven by using only the fuel cell as a power source, a hybrid (HEV) mode in which the motor is driven by using the fuel cell and the supercap as power sources, and a regenerative braking mode in which the supercap is charged.

Figure 2:
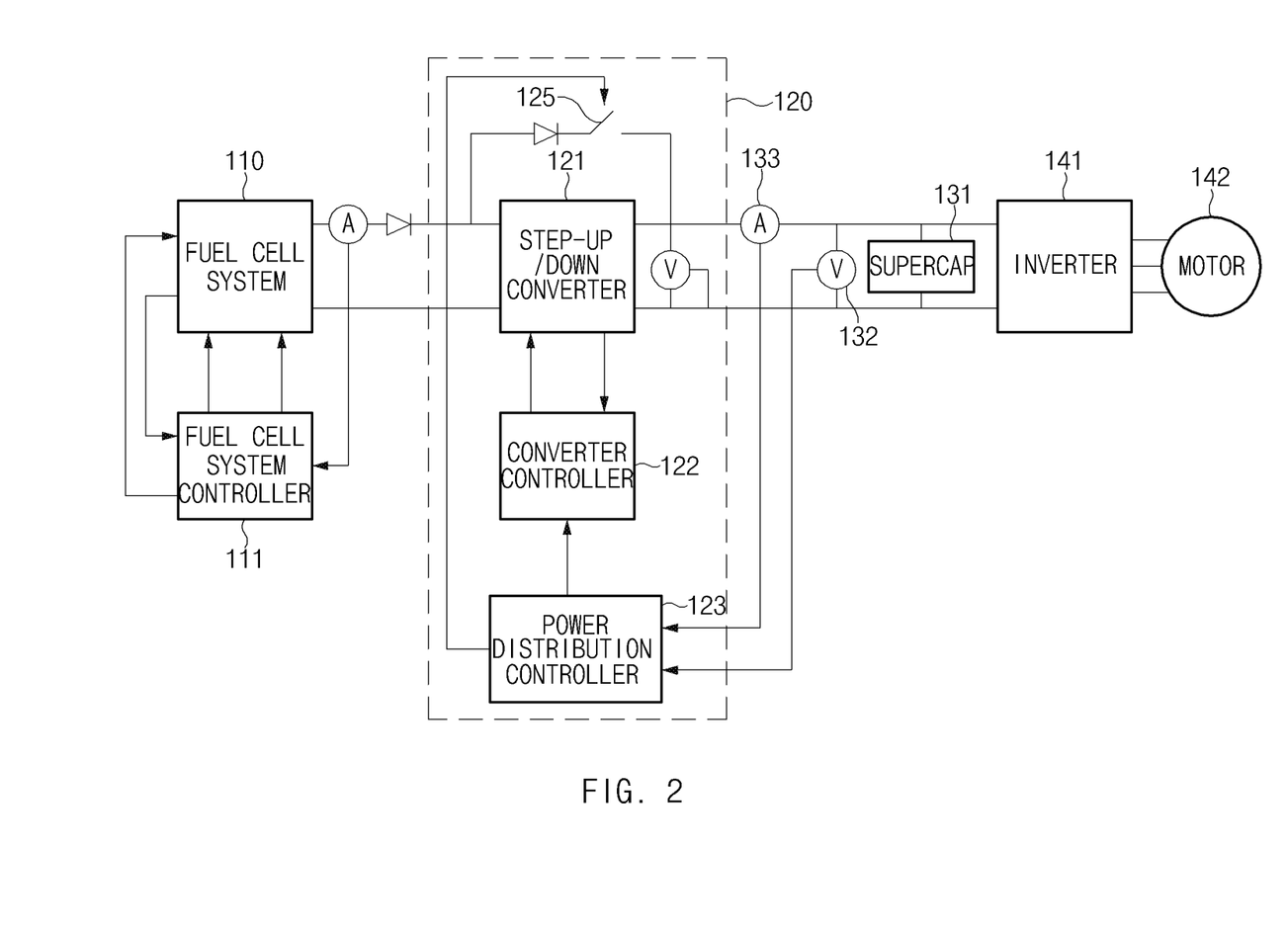
FIG. 2 is a block diagram illustrating a power system of a fuel cell-supercap hybrid vehicle according to an embodiment of the present disclosure.

FIG. 2 is a block diagram illustrating a power system of a fuel cell-supercap hybrid vehicle according to an embodiment of the present disclosure.

Referring to FIG. 2, a fuel cell-supercap hybrid vehicle may include a fuel cell system 110 including a fuel cell (stack) as a main power source and a fuel cell accessories (an air blower, a hydrogen recirculation blower, a water pump, and the like), a fuel cell system controller 111 for system driving control of the fuel cell accessories, a power converting device 120, and a supercap 131 as an auxiliary power source, and an inverter 141 for driving a motor 142. In this case, a voltage sensor 132 and a current sensor 133 may be connected to the supercap 131.

The power converting device 120 may include a step-up/down converter 121 installed between the fuel cell system 110 and the supercap 131 to serve as a kind of load for constant current operation of the fuel cell such that a constant current is output from the fuel cell system 110, a direct connection switch 125 installed between the fuel cell system 110 and the supercap 131 to selectively connect/block the fuel cell system 110 and the supercap 131, a converter controller 122 for controlling the driving of the step-up/down converter 121 by sensing an output terminal voltage of the step-up/down converter 121 through a voltage sensor 124, and a power distribution controller 123 that controls the driving of the converter controller 122 and the direct connection switch 125 as an upper level controller for selecting and controlling an operation mode of the fuel cell system 110.

The operation mode selection and control of the fuel cell system 110 may be performed through cooperative control between controllers including the power distribution controller 123, the fuel cell system controller 111, the converter controller 122, and the like.

As noted, the fuel cell system 110 may drive and control system components such as a fuel cell accessories and the like such that a current corresponding to the amount of loads applied to the stack output side can be output from the stack. That is, as the load applied to the output side draws out current, the system control in which the stack current output corresponding thereto is performed in the fuel cell system 110 may be performed.

Accordingly, when the load amount on the stack output side is specifically set by the step-up/down operation of the step-up/down converter 121, the components of the fuel cell system 110 is controlled such that the corresponding stack current output is made. As a result, when the load amount is properly adjusted by controlling the driving of the step-up/down converter 121, the constant output operation of the stack may be performed at a desired operating point. When the step-up/down converter 121 performs the step-up/down operation to fix the load amount on the stack output side as desired, the constant output operation may be enabled while the output current value of the fuel cell is fixed.

The direct connection switch 125 according to an embodiment may be a relay or insulated gate bipolar transistor (IGBT) element. Because the fuel cell system 110 and the supercap 131 may be connected or blocked selectively and directly by the direct connection switch 125, when compared with a conventional fuel cell-supercap direct connection system, the degree of freedom of fuel cell output control may be increased, so that the embodiment may be advantageous in terms of fuel efficiency and fuel cell protection.

Figure 3:
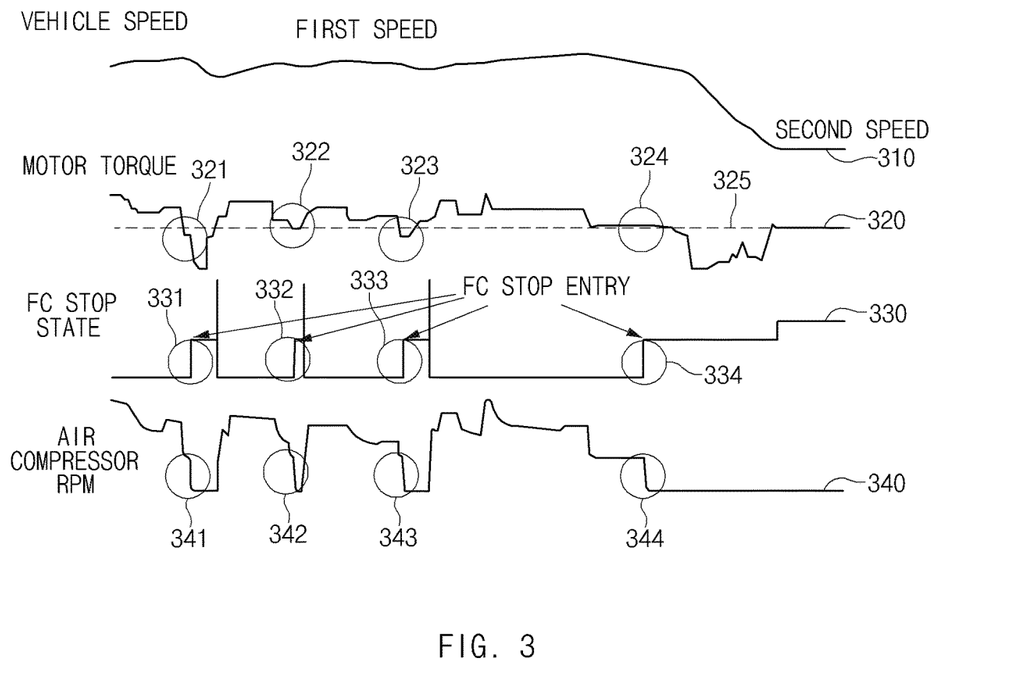
FIG. 3 is a view illustrating a procedure of entering a fuel cell stop mode in a hydrogen electric vehicle according to an embodiment of the present disclosure.

FIG. 3 is a view illustrating a procedure of entering a fuel cell stop mode in a hydrogen electric vehicle according to an embodiment of the present disclosure.

In order to increase the fuel efficiency of a hydrogen electric vehicle, it is necessary to minimize unnecessary fuel cell operation.

Because the driving force is not required in the stopped state or the decelerated state, it is effective to improve fuel efficiency by temporarily stopping the driving of the fuel cell to block unnecessary fuel consumption, which is called FC STOP.

Referring to FIG. 3, reference numerals 310 and 320 denote graphs that show a vehicle speed change from a first speed (e.g., 90 km/h) to a second speed (e.g., 0 km/h) and a motor torque change corresponding to the vehicle speed change, respectively. Reference numerals 330 and 340 are graphs showing a change in the FC STOP state corresponding to the motor torque change and a change in an air compressor RPM corresponding to the change in the FC STOP state, respectively.

Referring to reference numerals 310 and 320, when the vehicle speed decreases while driving, the motor torque is also reduced accordingly, and when the motor torque falls below a specified FC STOP entry reference value 325 as denoted by reference numerals 321 to 324, as denoted by reference numerals 331 to 334, the FC STOP state signal transitions from a low state to a high state, so that the fuel cell system enters the FC STOP mode (or FC STOP state).

When entering the FC STOP mode, as denoted by reference numerals 341 to 344, the RPM of the air compressor is drastically reduced, that is, the air compressor is stopped, so that the fuel cell system may be switched from a normal driving state to a temporal stop state, that is, an idle state. Thus, when the fuel cell system enters the FC STOP mode, the energy consumed by the air compressor may be saved.

Figure 4:
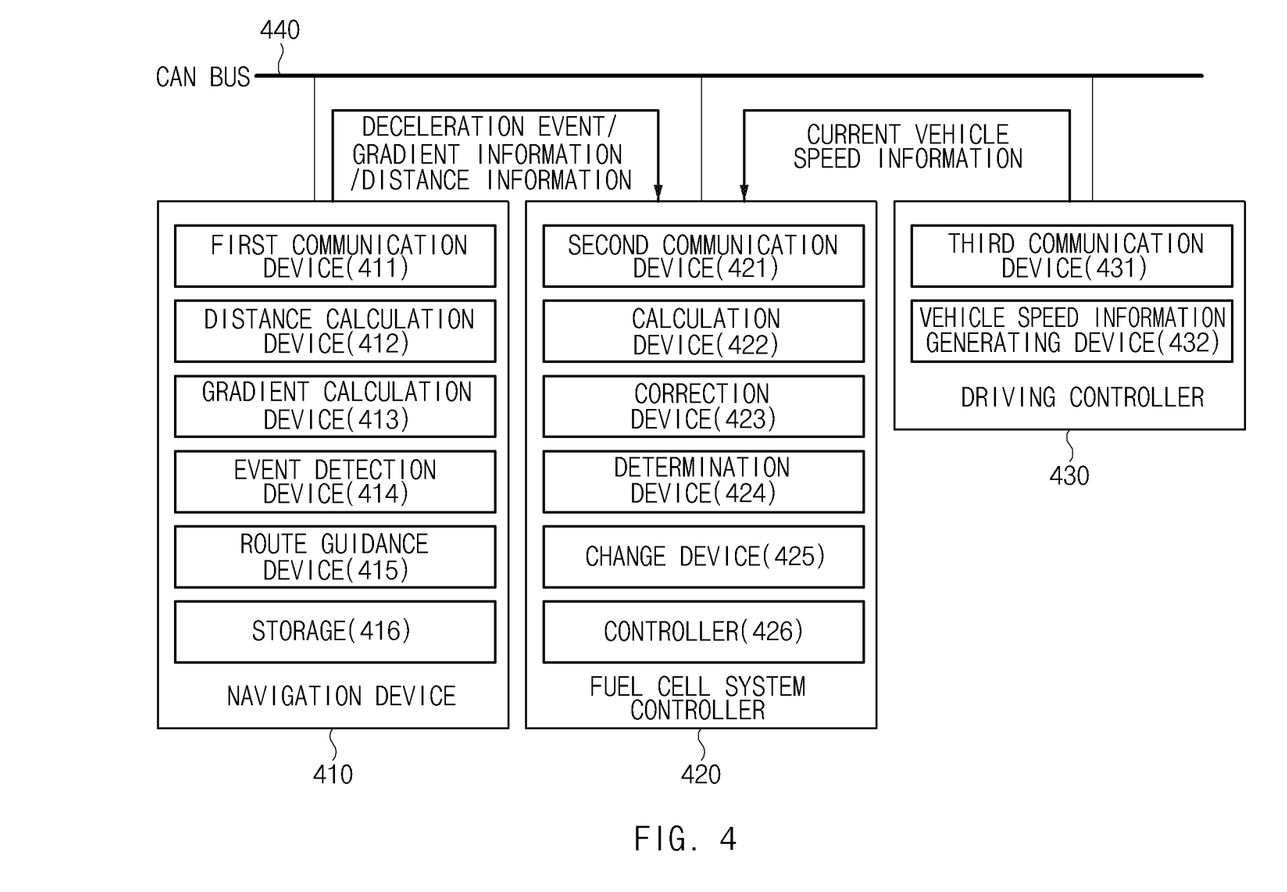
FIG. 4 is a view illustrating a fuel cell electric vehicle fuel efficiency improvement system according to an embodiment of the present disclosure.

FIG. 4 is a view illustrating a fuel cell electric vehicle fuel efficiency improvement system according to an embodiment of the present disclosure.

Hereinafter, for convenience of description, the fuel cell electric vehicle fuel efficiency improvement system will be referred to simply as a fuel efficiency improvement system 400.

Referring to FIG. 4, the fuel efficiency improvement system 400 may substantially include a navigation device 410, a fuel cell system controller 420, and a driving controller 430.

The driving controller 430 according to an embodiment may be provided with at least one controller for driving speed control, and a sensor, for example, which includes at least one of a brake controller, an accelerator controller, and a wheel sensor.

The navigation device 410, the fuel cell system controller 420, and the driving controller 430 may be connected to a controller area network (CAN) bus to exchange information.

The navigation device 410 according to an embodiment may include a first communication device 411 for CAN communication, a distance calculation device 412 for calculating the distance from a current location to a deceleration target, a gradient calculation device 413 for calculating a road average slope from the current location to the deceleration target, an event detection device 414 for detecting a deceleration event; a route guidance device 415 for performing basic route guidance or destination route guidance to a destination set by a user, and storage 416 for storing various traffic information and map information for route guidance.

The event detection device 414 according to an embodiment may determine, as the deceleration target, a road branch start point, a highway toll gate entry/exit point, a speed bump, an speed enforcement camera position, a speed limit change point, a safe driving section start point, a congestion section start point, a sharp curve section start point, a right turn point, and the like.

The event detection device 414 may detect the deceleration target on the driving path with reference to the storage 416 and identify a deceleration event corresponding to the detected deceleration target.

The distance calculation device 412 and the gradient calculation device 413 may calculate the distance from the current location to the detected deceleration target, and a gradient, which is the average road slope, from the current location to the detected deceleration target in response to the identified deceleration event, respectively.

The navigation device 410 may transmit deceleration event information, the calculated distance from the current location to the event point corresponding to the deceleration event, and the gradient information, which is the average road slope information from the current location, to the event point to the fuel cell system controller 420 through the first communication device 411.

The driving controller 430 may include a third communication device 431 performing CAN communication, and a vehicle speed information generation device 432 for generating current vehicle speed, that is, current driving speed information.

According to an embodiment, the driving controller 430 may transmit current vehicle speed information to the fuel cell system controller 420 through CAN communication.

The fuel cell system controller 420 according to another embodiment of the present disclosure may obtain the current vehicle speed information from the navigation device 410.

The fuel cell system controller 420 may include a second communication device 421, a calculation device 422, a correction device 423, a determination device 424, a change device 425, and a controller 426.

The fuel cell system controller 420 may acquire the deceleration event information, the gradient information, the distance information, and the current vehicle speed information through the second communication device 421.

The calculation device 422 may calculate a coasting line from a current location to the deceleration target, that is, an event point, based on a coast down constant value that is a unique value of the corresponding vehicle and the weight of the corresponding vehicle. That is, the calculation device 422 may calculate the coasting line from the event point that is the deceleration end location to the current vehicle location.

The coasting line refers to a speed profile that performs coast-down such that the speed of the vehicle becomes a target speed (e.g., 30 kph) at the event point (e.g., right turn) where deceleration occurs.

The calculation device 422 may calculate the coasting line from the deceleration event occurrence point to the current location whenever the deceleration event occurs. The method of calculating the coasting line will be more apparent through the description of FIG. 5 to be described later.

The correction device 423 may correct the coasting line calculated by the calculation device 422 by reflecting the gradient information. That is, the correction device 423 may improve the accuracy of the coasting line calculated by the calculation device 422 by reflecting the road slope from the deceleration target to the current location. The coasting line correcting method of the correction device 423 will be more apparent through the description of FIG. 6 to be described later.

The determination device 424 may determine whether deceleration is necessary by comparing the current traveling speed with the coasting speed at the current location on the corrected coasting line.

The determination device 424 according to an embodiment may determine that the deceleration is necessary when the current traveling speed is greater than the coasting line speed. To the contrary, when the current traveling speed is less than or equal to the coasting line speed, the determination device 424 may determine that deceleration is unnecessary.

As an example, when the current traveling speed is greater than the coasting line speed, because the driver is likely to reduce the speed by stepping on the brake, the mode enters the FC STOP mode. To the contrary, when the current traveling speed is lower than the coasting line speed, the mode does not enter FC STOP mode because the driver is likely to continue accelerating slightly.

The method of determining whether to decelerate through the speed comparison of the determination device 424 will be more apparent through the description of FIG. 7 to be described later.

The change device 425 may dynamically change the FC STOP state entry condition based on the determination result of the determination device 424.

As an example, when the determination device 424 determines that the deceleration is required, the change device 425 may change the motor torque reference value for determining whether to enter the FC STOP mode to a certain level higher than the currently set motor torque reference value. To the contrary, when deceleration is unnecessary, the motor torque reference value for entering the FC STOP mode may be maintained as it is.

When the motor torque reference value for entering the FC STOP mode is increased by the change device 425, that is, when the FC STOP mode entry condition is relaxed, the fuel cell system enters the FC STOP mode faster than before. Thus, the fuel efficiency of the fuel cell electric vehicle may be improved. The method of changing the FC STOP entry condition of the change device 425 will be more apparent through the description of FIG. 8 to be described later.

The controller 426 may determine whether to enter the FC STOP mode by comparing the current motor torque and the set motor torque reference value.

For example, when the current motor torque falls below the motor torque reference value, the controller 426 may control the FC STOP state signal to be HIGH, thereby allowing the fuel cell system to enter the FC STOP mode.

Figure 5:
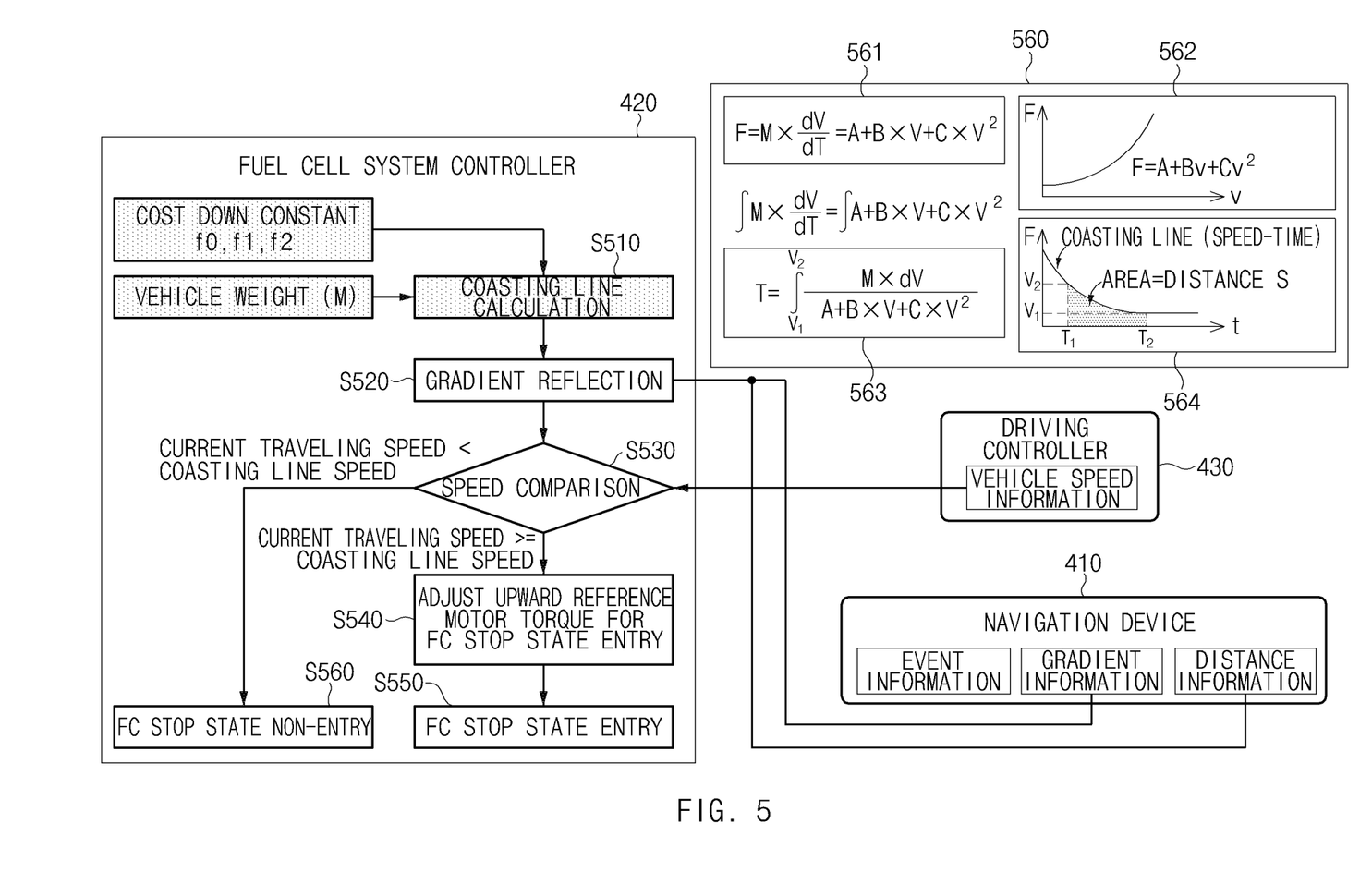
FIG. 5 is a view illustrating a method of calculating a coasting line in a fuel cell system controller according to an embodiment.

FIG. 5 is a view illustrating a method of calculating a coasting line in a fuel cell system controller according to an embodiment.

Referring to FIG. 5, in S510, the calculation device 422 of the fuel cell system controller 420 may calculate the coasting line 'F' based on coast down constants f0, f1 and f2 and vehicle weight 'M', which are unique values of the vehicle.

In this case, 'F' may be expressed as "$A+B*V+C*V^2$", as denoted by reference numerals 561 and 562.

In addition, time 'T' (i.e., T2−T1) taken to reach the target speed V1 when passing through the corresponding event point from the traveling speed V2 at the current time point T1 may be expressed as the formula of reference numeral 563.

Referring to reference numeral 564, for a coasting line expressed as a speed-time function, the integral value from T1 to T2 means distance 'S' traveled to reach speed V1 from speed V2.

Figure 6:
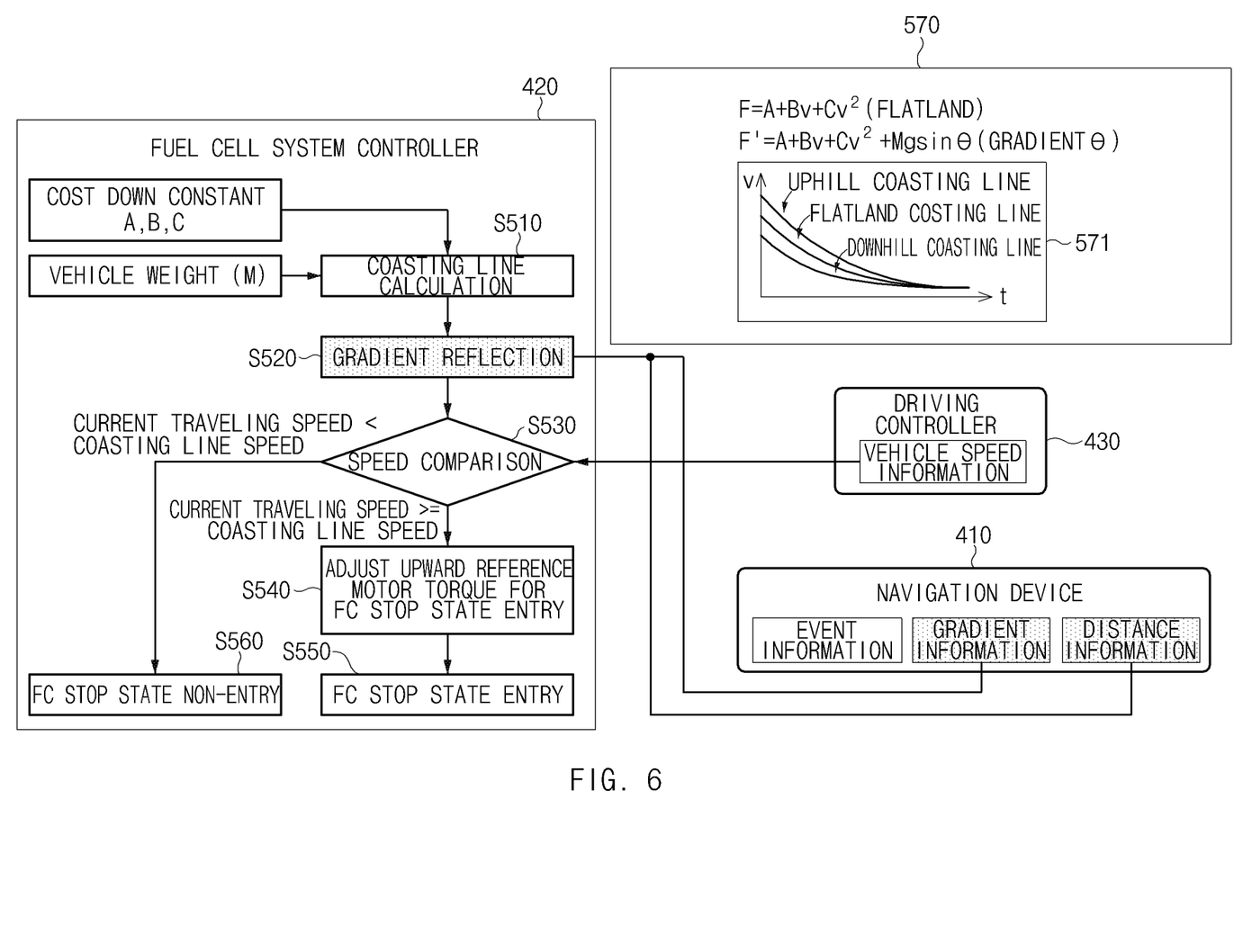
FIG. 6 is a view illustrating a method of correcting the coasting line by reflecting the gradient information in the fuel cell system controller according to an embodiment.

FIG. 6 is a view illustrating a method of correcting the coasting line by reflecting the gradient information in the fuel cell system controller according to an embodiment.

Referring to FIG. 6, in S520, the correction device 423 of the fuel cell system controller 420 may correct the coasting line 'F' calculated by the calculation device 422 based on the gradient information received from the navigation device 410.

Referring to reference numeral 570, the coast line 'F' may be expressed as "$A+B*V+C*V^2$" in flatland.

When the road slope from the current vehicle location to the event point is '0', the coast line 'F' to which the gradient information is reflected may be expressed as "$A+B*V+C*V^2+Mg*\sin\theta$". Where Mg is a gradient constant. The gradient constant may be a unique value of the corresponding vehicle.

The correction device 423 according to an embodiment may calculate the average gradient of the corresponding road section by using the gradient information and distance information received from the navigation device 410 when deceleration is required from the current vehicle location to the event point, and may correct the coasting line in accordance with the increase and decrease of the force acting on the vehicle during uphill and downhill running as denoted by reference numeral 571.

Figure 7:
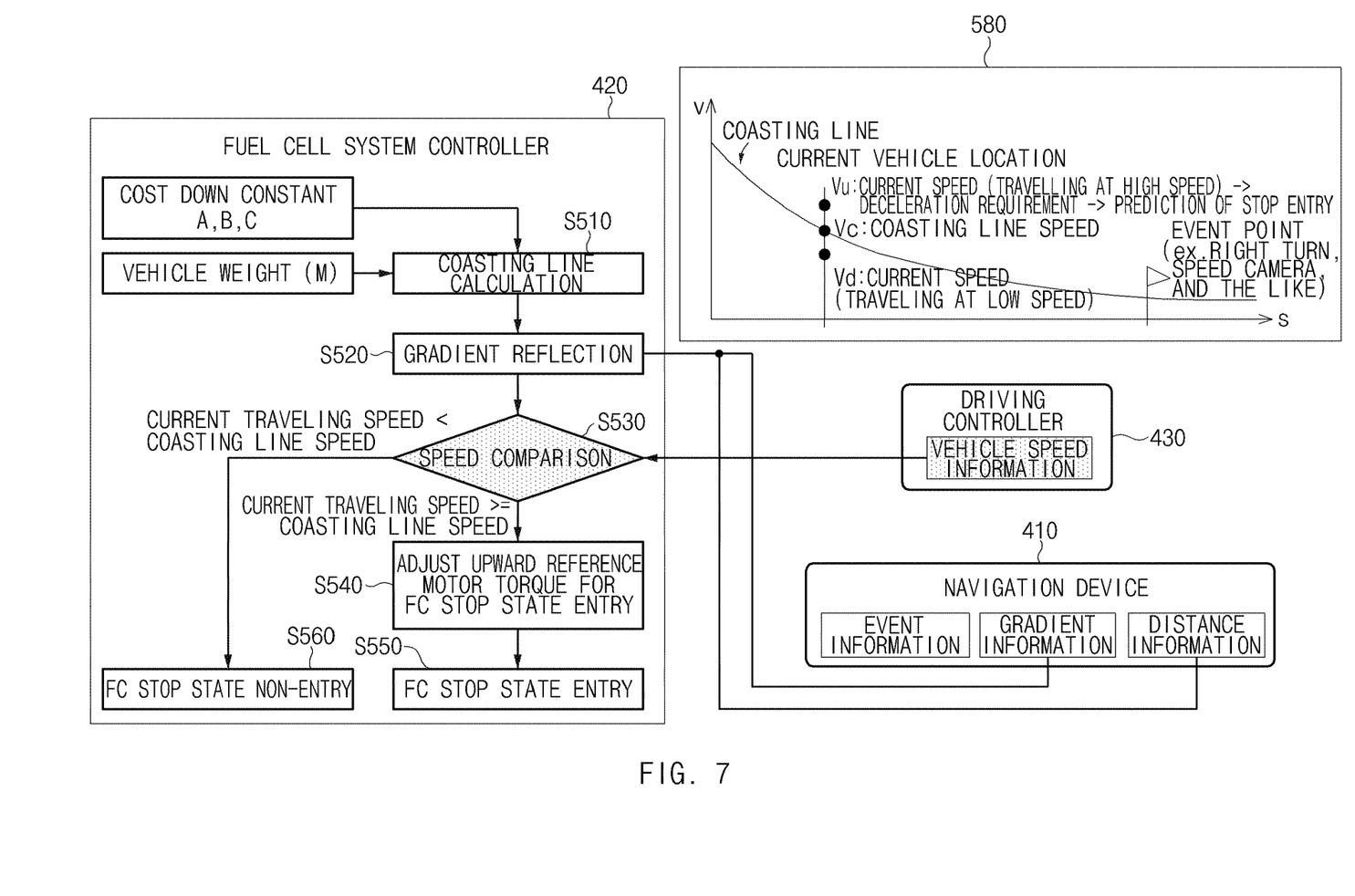
FIG. 7 is a view illustrating a method of determining whether deceleration is necessary by using the vehicle speed information in the fuel cell system controller according to an embodiment.

FIG. 7 is a view illustrating a method of determining whether FC STOP, that is, deceleration is necessary by using the vehicle speed information in the fuel cell system controller according to an embodiment.

Referring to FIG. 7, in S530, the determination device 424 of the fuel cell system controller 420 may determine whether deceleration is necessary by comparing the current traveling speed based on the vehicle speed information received from the driving controller 430 with the coasting line speed at the current vehicle location based on the coasting line 'F' corrected by the correction device 423.

In S570, when the current traveling speed is less than the coasting line speed, the determination device 424 may determine that it is unnecessary to decelerate the vehicle and maintain the current normal driving state without entering the FC STOP state.

When the current traveling speed is greater than or equal to the coasting line speed, the determination device 424 may determine that it is not necessary to decelerate the vehicle.

Referring to reference numeral 580, when a specified event such as a right turn, a speed camera, and the like is detected during travelling at a high speed, and a current traveling speed Vu at the current vehicle location is greater than the coasting line Vc, the determination device 424 may determine that vehicle deceleration is necessary and predict the FC STOP entry.

To the contrary, even if the event is detected during traveling at a low speed, the determination device 424 may determine that the vehicle deceleration is not necessary and predict FC STOP non-entry when the current traveling speed Vu at the current vehicle location is smaller than the coasting line speed Vc.

Figure 8:
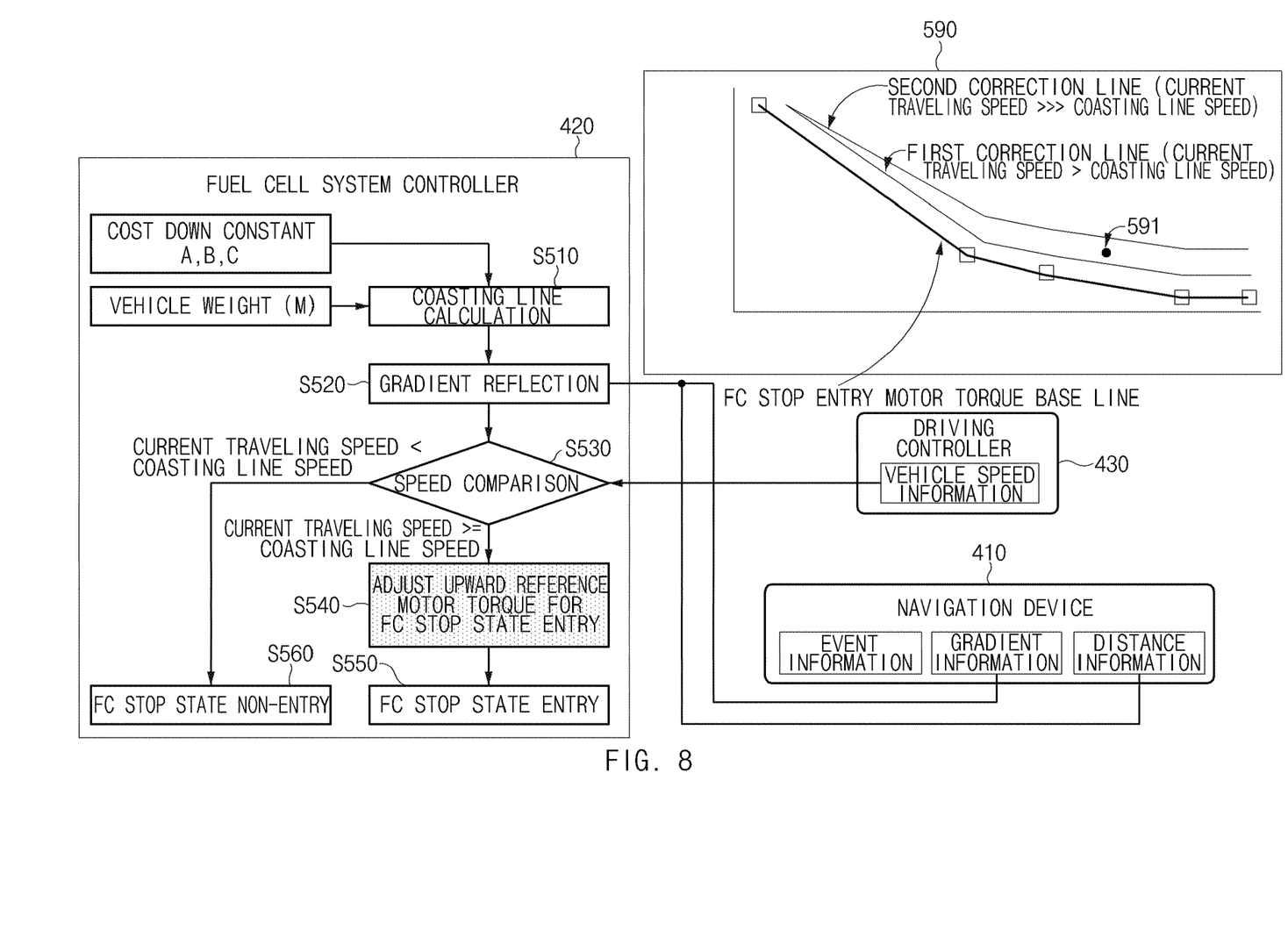
FIG. 8 is a view illustrating a method of changing a FC STOP state entry condition in a fuel cell system controller according to an embodiment.

FIG. 8 is a view illustrating a method of changing a FC STOP state entry condition in a fuel cell system controller according to an embodiment.

Referring to FIG. 8, in S550, when it is determined that the current traveling speed is less than the coasting line speed and the vehicle deceleration is not necessary, the change device 425 of the fuel cell system controller 420 may increase the reference motor torque for FC STOP state entry.

The vehicle may enter the FC STOP state when the motor torque is less than a specified motor torque at a specific motor speed.

Referring to reference numeral 590, FC STOP entry motor torque basic line providing a criterion for identifying the motor torque capable of entering FC STOP state at the current traveling speed for each vehicle, which is referred to simply as a base line for convenience of description below, may be defined.

The change device 425 according to an embodiment may dynamically change the FC STOP entry motor torque basic line based on the difference between the current traveling speed and the coasting line speed.

For example, when the current traveling speed is greater than the coasting line speed by a first value, the base line may be adjusted upward to a first correction line.

As another example, when the current traveling speed is greater than the coasting line speed by a second value, the base line may be adjusted upward to the second correction line, where the second value is greater than the first value.

It is assumed that the FC STOP entry motor torque base line is changed to the second correction line based on the event detection. In this case, even if the current motor torque 591 of the vehicle is on the base line before the change, the current motor torque 591 is located below the second correction line, so that the corresponding vehicle may enter the FC STOP state.

It is assumed that the FC STOP entry motor torque base line is changed to the first correction line based on the event detection. In this case, because the current motor torque 591 of the vehicle is located above the first correction line as well as the base line before the change, the corresponding vehicle does not enter the FC STOP state.

Figure 9:
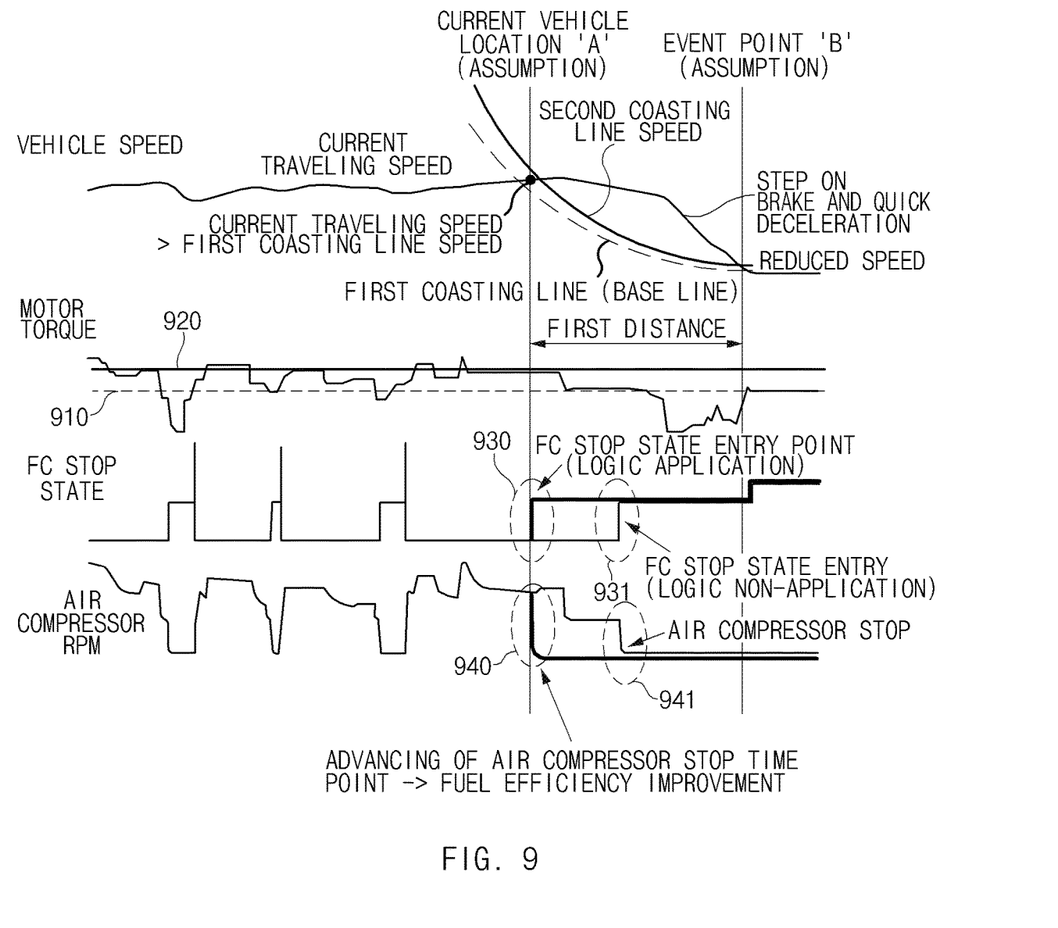
FIG. 9 is a view illustrating the fuel efficiency improvement effect of a fuel cell electric vehicle according to an embodiment of the present disclosure.

When the current driving speed is greater than the coasting line speed after the event detection during traveling, as shown in FIG. 9 to be described later, the fuel cell system controller 420 according to the present disclosure enters the FC STOP state faster, so that the fuel efficiency may be improved by advancing the air compressor stop point.

FIG. 9 is a view illustrating the fuel efficiency improvement effect of a fuel cell electric vehicle according to an embodiment of the present disclosure.

Referring to FIG. 9, when the fuel cell system controller 420 detects an event point, that is, a point at which deceleration is required, in front based on navigation information during traveling, the fuel cell system controller 420 calculates and corrects a coasting line. The fuel cell system controller 420 may determine whether deceleration is necessary by comparing the current traveling speed with the speed corresponding to the current location on the corrected coasting line, that is, the coasting line speed.

The fuel cell system controller 420 according to an embodiment may determine whether deceleration is necessary by comparing the current traveling speed with the coasting line speed at point 'A' which is before the first distance from event point 'B'. For example, the first distance may be 800 m, but is not limited thereto, and may be longer or shorter according to the design of a person skilled in the art. As another example, the first distance may be dynamically set corresponding to the average traveling speed during a unit time. For example, as the average driving speed increases, the first distance may increase.

When the current traveling speed is greater than the speed, which is referred to simply as the first coasting line speed, corresponding to the current location of the first coasting line which is the basic setting, the fuel cell system controller 420 may adjust upward a motor base line 910 for determining whether to enter the FC STOP state as denoted by reference numeral 920.

When the motor torque measured at the current traveling speed is located below the motor torque reference line 920 adjusted upward, the corresponding vehicle may enter the FC STOP state. Because the motor torque reference line is adjusted upward, the FC STOP state entry point may be advanced as denoted by reference numerals 930 and 931.

In addition, when the FC STOP state entry time is advanced, the air compressor stop time may be advanced as denoted by reference numerals 940 and 941.

When the air compressor quickly stops due to the fast FC STOP state entry, energy consumption by fuel cell system such as accessories may be reduced, so that the fuel efficiency may be improved. In addition, the durability of the fuel cell system may be improved by minimizing the driving time of accessories.

The processes of the method or algorithm described in relation to the embodiments of the present disclosure may be implemented directly by hardware executed by the processor, a software module, or a combination thereof. The software module may reside in a storage medium (that is, the memory and/or the storage), such as a RAM, a flash memory, a ROM, an EPROM, an EEPROM, a register, a hard disk, a detachable disk, or a CD-ROM.

The exemplary storage medium is coupled to the processor, and the processor may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

According to the present disclosure, there are provided a method of improving fuel efficiency of a fuel cell electric vehicle by using navigation information, and an apparatus and a system therefor.

In addition, according to the present disclosure, there are provided a method of improving fuel efficiency of a fuel cell electric vehicle by using navigation information, which can enter a fuel cell stationary state quickly and accurately by predicting the deceleration of a vehicle in advance based on map information obtained from the navigation, and an apparatus and a system therefor.

In addition, according to the present disclosure, it is possible to increase the durability of a stack by minimizing a fuel cell stack operating time relative to a vehicle mileage through the aggressive entry into the fuel cell stop state.

In addition, various effects that are directly or indirectly understood through the present disclosure may be provided.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

The invention claimed is:

1. A method of improving fuel efficiency of a fuel cell electric vehicle, the method comprising:
    collecting navigation information and vehicle speed information;
    calculating a coasting line when a specified event point is detected based on the navigation information;
    determining whether deceleration is necessary by comparing a current traveling speed with a coasting line speed corresponding to a current location;
    changing a motor torque reference value to a specific level higher than a currently set motor torque reference value when the deceleration is necessary; and
    determining whether to enter a fuel cell stop state by comparing a current motor torque and the changed motor torque reference value.

2. The method of claim 1, wherein the coasting line is calculated based on a coast down constant value and a weight of a corresponding vehicle.

3. The method of claim 1, wherein the navigation information includes gradient information of a road slope from the current location to the event point; and
    distance information from the current location to the event point.

4. The method of claim 3, further comprising:
    correcting the calculated coasting line by using the gradient information and the distance information.

5. The method of claim 2, wherein the determining of whether the deceleration is necessary includes:
    determining that the deceleration is necessary when the current traveling speed is equal to or greater than the coasting line speed; and
    determining that the deceleration is unnecessary when the current traveling speed is smaller than the coasting line speed.

6. The method of claim 5, wherein the changing of the motor torque reference value includes:
    adjusting a reference motor torque to a specified level to enter the fuel cell stop state when the current traveling speed is equal to or greater than the coasting line speed, and
    entering the fuel cell stop state when a current motor torque is less than the reference motor torque.

7. The method of claim 1, wherein the navigation information is received from a navigation device through controller area network (CAN) communication, and
    wherein the vehicle speed information is received from a driving controller through the CAN communication.

8. The method of claim 7, wherein the driving controller includes at least one of a brake controller, an accelerator controller, and a wheel sensor.

9. The method of claim 1, wherein the navigation information and the vehicle speed information are received from a navigation device through CAN communication.

10. The method of claim 1, wherein the event point includes at least one of a road branch start point, a highway toll gate entry/exit point, a speed bump, a speed enforcement camera position, a speed limit change point, a safe driving section start point, a congestion section start point, a sharp curve section start point, and a right turn point.

11. A fuel cell system controller for controlling a fuel cell system, the fuel cell system controller comprising:
    a communication device configured to collect navigation information and vehicle speed information;
    a calculation device configured to calculate a coasting line when a specified event point is detected based on the navigation information;

a determination device configured to determine whether deceleration is necessary by comparing a current traveling speed with a coasting line speed corresponding to a current location; and a change device configured to change a motor torque reference value to a specified level higher than a currently set motor torque reference value when deceleration is necessary;

wherein the determination device is configured to determine whether to enter a fuel cell stop state by comparing a current motor torque and the changed motor torque reference value.

12. The fuel cell system controller of claim 11, wherein the coasting line is calculated based on a coast down constant value and a weight of a corresponding vehicle.

13. The fuel cell system controller of claim 11, wherein the navigation information includes gradient information of a road slope from the current location to the event point; and distance information from the current location to the event point.

14. The fuel cell system controller of claim 13, further comprising:

a correction device configured to correct the calculated coasting line by using the gradient information and the distance information.

15. The fuel cell system controller of claim 12, wherein the determination device is configured to determine that the deceleration is necessary when the current traveling speed is equal to or greater than the coasting line speed, and determine that the deceleration is unnecessary when the current traveling speed is smaller than the coasting line speed.

16. The fuel cell system controller of claim 15, wherein the change device is configured to adjust a reference motor torque to a specified level to enter the fuel cell stop state when the current traveling speed is equal to or greater than the coasting line speed, and enter the fuel cell stop state to stop an air compressor of the fuel cell system when a current motor torque is less than the reference motor torque.

17. The fuel cell system controller of claim 11, wherein the navigation information is received from a navigation device through controller area network (CAN) communication, and wherein the vehicle speed information is received from a driving controller through the CAN communication.

18. The fuel cell system controller of claim 17, wherein the driving controller includes at least one of a brake controller, an accelerator controller, and a wheel sensor.

19. The fuel cell system controller of claim 11, wherein the navigation information and the vehicle speed information are received from a navigation device through CAN communication.

20. The fuel cell system controller of claim 11, wherein the event point includes at least one of a road branch start point, a highway toll gate entry/exit point, a speed bump, a speed enforcement camera position, a speed limit change point, a safe driving section start point, a congestion section start point, a sharp curve section start point, and a right turn point.

* * * * *